US011239792B2

(12) United States Patent
Grant

(10) Patent No.: US 11,239,792 B2
(45) Date of Patent: Feb. 1, 2022

(54) DEPLOYABLE SOLAR TRACKER SYSTEM

(71) Applicant: CEP-IP LTD, Cambridgeshire (GB)

(72) Inventor: Thomas McGregor James Grant, Cambridgeshire (GB)

( * ) Notice: Subject to any disclaimer, the term of this patent is extended or adjusted under 35 U.S.C. 154(b) by 0 days.

(21) Appl. No.: 16/755,295

(22) PCT Filed: Sep. 20, 2018

(86) PCT No.: PCT/EP2018/075434
§ 371 (c)(1),
(2) Date: Apr. 10, 2020

(87) PCT Pub. No.: WO2019/072514
PCT Pub. Date: Apr. 18, 2019

(65) Prior Publication Data
US 2021/0226580 A1    Jul. 22, 2021

(30) Foreign Application Priority Data

Oct. 10, 2017  (EP) .................................... 17195641

(51) Int. Cl.
*H02S 30/20*  (2014.01)
*H02S 20/32*  (2014.01)
(Continued)

(52) U.S. Cl.
CPC ............ *H02S 30/20* (2014.12); *F24S 30/425* (2018.05); *H02S 20/32* (2014.12); *H02S 40/34* (2014.12);
(Continued)

(58) Field of Classification Search
CPC ....... H01L 31/00–078; Y02E 10/50–60; H02S 30/00–20
(Continued)

(56) References Cited

U.S. PATENT DOCUMENTS

2013/0269750 A1 * 10/2013 Tucker .................... H02S 30/20
136/245
2013/0340807 A1 * 12/2013 Gerwing ................. H01L 31/02
136/246
(Continued)

FOREIGN PATENT DOCUMENTS

DE            2163487       *  3/2010
JP     WO2016063956       *  4/2016

OTHER PUBLICATIONS

EP2163487 English translation (Year: 2010).*

*Primary Examiner* — Bach T Dinh
(74) *Attorney, Agent, or Firm* — Eugenio J. Torres-Oyola; Victor M. Rodriguez-Reyes; Rafael Rodriguez-Muriel

(57) ABSTRACT

The deployable solar tracker system comprises a single-axis solar tracker (1) including a plurality of foldable panel array sections (10, 10a). Each foldable panel array section (10, 10a) comprises a shaft section (11), a plurality of support ribs (12) hinged to the shaft section (11), a plurality of solar panels (13) attached to the support ribs (12) and a handling element (28) attached on top of the shaft section (11). The handling element (28) has one or more handle openings (29, 30) dimensioned for receiving one or more lift members oriented in a transversal direction perpendicular to the shaft section (11). The handle openings (29, 30) of the handling elements (28) of the plurality of the foldable panel array sections (10, 10a) are mutually aligned when the plurality of foldable panel array sections (10, 10a) are arranged in a shipping arrangement.

13 Claims, 10 Drawing Sheets

(51) Int. Cl.
  *H02S 40/34*    (2014.01)
  *F24S 30/425*   (2018.01)
  *F24S 25/00*    (2018.01)

(52) U.S. Cl.
  CPC .... *F24S 2025/012* (2018.05); *F24S 2025/013* (2018.05)

(58) Field of Classification Search
  USPC .................................................. 136/243–265
  See application file for complete search history.

(56) References Cited

U.S. PATENT DOCUMENTS

| | | | | |
|---|---|---|---|---|
| 2014/0020731 | A1* | 1/2014 | Levi | F24S 25/70 136/245 |
| 2014/0360552 | A1* | 12/2014 | Britcher | H01L 31/18 136/244 |
| 2017/0294873 | A1* | 10/2017 | Mori | F24S 30/452 |
| 2019/0044011 | A1* | 2/2019 | Pereira | H02S 30/20 |

* cited by examiner

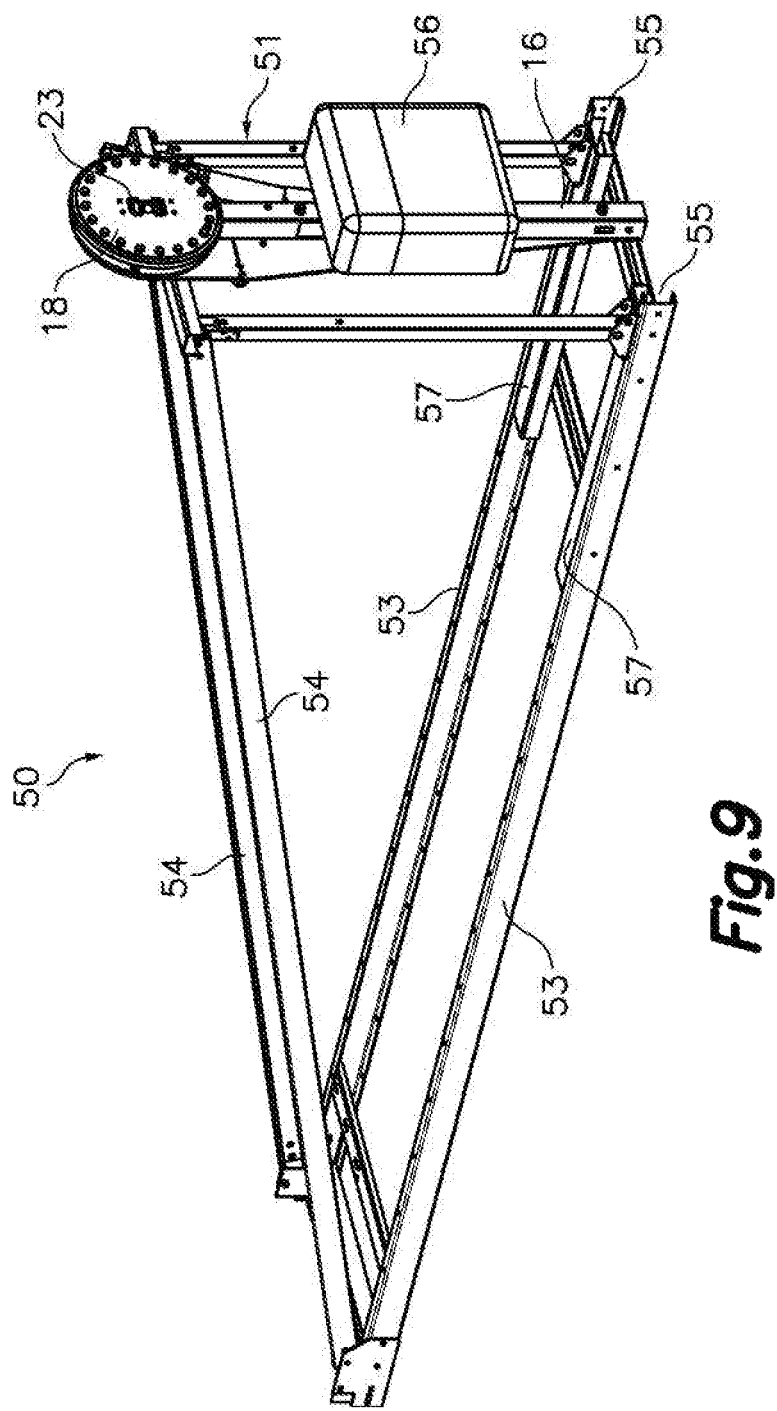

DEPLOYABLE SOLAR TRACKER SYSTEM

TECHNICAL FIELD

The present invention concerns in general a deployable solar tracker system and more in particular a deployable solar tracker system including a plurality of foldable panel array sections which once folded into a shipping arrangement can be fitted into a transport frame constituting a transport unit configured for being shipped for example by a transport vehicle and optionally within a standard shipping container.

The foldable panel array sections have side handle openings arranged at middle portions of shaft sections thereof, mutually aligned in the shipping arrangement, and dimensioned for receiving a lift member or fork members of a forklift oriented in a transversal direction perpendicular to the shaft sections, and the transport frame has end fork-receiving openings arranged at a longitudinal front end of the transport unit and dimensioned for receiving the fork members of the forklift oriented in a longitudinal direction of the transport unit.

BACKGROUND OF THE INVENTION

Deployable solar tracker systems are known comprising a single-axis solar tracker including a plurality of foldable panel array sections, wherein each foldable panel array section comprises a plurality of paired support ribs arranged at opposite sides of a shaft section and hinged to the shaft section, and a plurality of solar panels attached to the support ribs, whereby the support ribs and solar panels are movable between a folded position, in which the solar panels are opposite and parallel to each other, and an unfolded position, in which energy-collecting surfaces of the solar panels are coplanar to each other.

Document US 20130340807 A1 describes one of such deployable solar tracker systems wherein the plurality of foldable panel array sections are configured for being shipped together in a shipping arrangement by a transport vehicle and for being unloaded in a deployment location and arranged in a work arrangement. In the shipping arrangement, the respective shaft sections are side by side and parallel to each other and the support ribs and solar panels are in the folded position. In the work arrangement the respective shaft sections are aligned and connected together and the support ribs and solar panels are in said unfolded position. The deployable solar tracker system includes A-shaped support assemblies for rotatably supporting the shaft sections of the foldable panel array sections in the work arrangement. The A-shaped support assemblies may be shipped separately.

A drawback of the deployable solar tracker system described in cited document US 20130340807 A1 is that the plurality of foldable panel array sections are arranged on the transport vehicle without being fitted in a transport frame or a shipping container so that each foldable panel array section has to be individually handled with a crane to be loaded to and unloaded from the transport vehicle. Another drawback is that the foldable panel array sections do not include foldable supporting legs so that support assemblies, such as A-shaped support assemblies, have to be shipped separately.

Document WO 2017068413 A1 discloses a deployable solar tracker system comprising a plurality of foldable panel array sections, each having a shaft section, foldable solar panels and foldable supporting legs. The shaft sections of the foldable panel array sections are connected together by universal joints and are foldable in a zig-zag fashion so that they are next and parallel to one another when in a folded transport configuration and aligned with each other when in a deployed work arrangement. In the transport configuration, the deployable solar tracker system takes a significantly reduced volume in spite of being fully assembled and it can be stored and shipped within a standard shipping container. The solar tracker is equipped with wheels or skids and can be rolled or skidded out of the shipping container and deployed without using heavy machinery.

However, as the standard shipping containers have a door in a longitudinal end thereof, it is not clear in cited document WO 2017068413 A1 how the solar tracker can be rolled or skidded in and out of the shipping container through the longitudinal end door thereof and which kind of non-heavy machinery can be used for doing this.

Document US 20120152310 A1 discloses a concentrated photovoltaic system comprising a two-axis tracker assembly having a set of solar receivers, each with its own secondary concentrator optic, aligned within and secured in place in each tracker assembly in a foldable paddle structure. The paddles are shipped with multiple units stacked together and stand vertically. Each paddle structure has a designed shape and dimension to be loaded with one or more modules to fit into a standard shipping container. A lift platform is used to load the folded paddle structure into the standard shipping container through a longitudinal end door thereof. This document does not disclose, however, how the folded paddle structure is loaded to and unloaded from the lift platform.

Document U.S. Pat. No. 9,287,822 B2 discloses a portable self-sustained power system including a transportable platform, a plurality of solar array racking structures and a plurality of solar panels securely mounted upon the solar array racking structures thereby supporting the solar panels to form a plurality of planar solar arrays. The folded solar power system can be picked up and manipulated by using a truck and hook hoist combination to load the folded solar power system on a truck or a trailer, and then to slid it into position at the deployment location without using a detachable transport frame neither a shipping container.

An aim of the present invention is providing a deployable solar tracker system comprising a single-axis solar tracker including a plurality of subassemblies which once folded into a shipping arrangement can be jointly or individually handled with a forklift from either side thereof.

Another aim of the present invention is providing a deployable solar tracker system comprising a single-axis solar tracker including a plurality of subassemblies which once folded into a shipping arrangement can be fitted into a transport frame, all together defining a transport unit which can be handled with a forklift from a longitudinal front end of the transport unit, making it possible, for example, for the transport unit to be loaded into and unload from a standard shipping container through a longitudinal end door thereof.

DISCLOSURE OF THE INVENTION

The foregoing and other aims are achieved according to the present invention by providing a deployable solar tracker system comprising a single-axis solar tracker and optionally a transport frame.

The single-axis solar tracker includes a plurality of foldable panel array sections. Each foldable panel array section comprises a shaft section, a plurality of support ribs arranged at opposite sides of the shaft section and hinged to the shaft section, and a plurality of solar panels attached to the support ribs. The support ribs together with the solar panels are movable between a folded position, in which the solar panels are opposite and parallel to each other, and an unfolded position, in which energy-collecting surfaces of the solar panels are coplanar to each other.

The plurality of foldable panel array sections are configured for being shipped together, for example by a transport vehicle, in a shipping arrangement in which the respective shaft sections are side by side and parallel to each other and the support ribs and solar panels are in the folded position, and for being unloaded in a deployment location and arranged in a work arrangement, in which the respective shaft sections are aligned and connected together and the support ribs and solar panels are in the unfolded position.

Each foldable panel array section has a handling element attached on top of the shaft section in the folded position and located at a middle portion thereof. This handling element defines one or more handle openings dimensioned for receiving one or more lift members in a transversal direction perpendicular to the shaft section, with the one or more lift members being able to be lifted and lowered by a lifting machine.

In the shipping arrangement, the handle openings of the handling elements of all the foldable panel array sections are mutually aligned so that the one or more lift members can be inserted through all the aligned handle openings. This way, the plurality of foldable panel array sections arranged in the shipping arrangement or each individual foldable panel array section arranged in the folded position is able to be handled with the lifting machine.

In one embodiment, the one or more handle openings of each handle element comprise one or more side fork-receiving openings dimensioned for receiving fork members of a forklift oriented in a transversal direction perpendicular to the shaft section, so that the forklift can act as the lifting machine for handling one single foldable panel array section arranged into the folded position or the plurality of foldable panel array sections arranged into the shipping arrangement from either side thereof.

In another embodiment, the one or more handle openings of each handle element comprise at least one lift bar-receiving opening dimensioned for receiving a lift bar which can be hooked by opposite protruding ends thereof by a crane, so that the crane can act as the lifting machine for handling one single foldable panel array section arranged into the folded position or the plurality of foldable panel array sections arranged into the shipping arrangement.

In an alternative embodiment, the one or more handle openings of each handle element comprise both the side fork-receiving openings dimensioned for receiving the fork members of a forklift and the lift bar-receiving opening dimensioned for receiving the lift bar.

The transport frame is elongated in a longitudinal direction and comprises a front end and an opposite rear end in the longitudinal direction. For example, the transport frame has a length in the longitudinal direction that is 5 or more times longer than a width in a transversal direction.

The transport frame has a front frame assembly at the front end, longitudinal base members parallel to the longitudinal direction, transversal base members, and side members connected together so as to hold the plurality of foldable panel array sections in the shipping arrangement, with the respective shaft sections arranged side by side, parallel to each other and parallel to the longitudinal base members.

Thus, the plurality of foldable panel array sections are configured for being shipped in the shipping arrangement together with the transport frame. The deployable solar tracker system includes one or more locking members configured to be attached to the transport frame engaging the plurality of foldable panel array sections arranged in the shipping arrangement and fitted into the transport frame to secure the plurality of foldable panel array sections to the transport frame. The plurality of foldable panel array sections together with the transport frame constitutes a transport unit.

The transport frame and the locking members do not hinder the handling elements of the foldable panel array sections in the transport unit so that the transport unit is also able to be handled with a lifting machine by using the aligned lift member-receiving openings of the plurality of foldable panel array sections. For example, the transport unit is able to be handled with a forklift from either side of the transport unit by using the aligned side fork-receiving openings of the plurality of foldable panel array sections or by a lift bar hooked by a crane by using the aligned lift bar-receiving openings of the plurality of foldable panel array sections.

The transport frame preferably comprises end fork-receiving openings arranged at a longitudinal front end thereof. The end fork-receiving openings are shaped and dimensioned for receiving fork members of a forklift oriented in a longitudinal direction parallel to the longitudinal base members. The transport frame further comprises rigidizing structural elements providing flexural stiffness to the transport frame in the longitudinal direction.

Thus, the transport unit is able to be handled with a forklift from a longitudinal front end of the transport unit by using the end fork-receiving openings of the transport frame. This allows, for example, loading and unloading the transport unit into and from a standard shipping container through a longitudinal end door thereof.

Preferably, the aforementioned end fork-receiving openings of the transport frame are defined by longitudinal fork-receiving members comprised in the front frame assembly, with the longitudinal fork-receiving members being parallel to the longitudinal direction.

Alternatively, the transport unit, the plurality of foldable panel array sections or each individual foldable panel array section can be handled by means of a crane hooking the handling elements or using handling straps, for example.

In one embodiment, the rigidizing structural elements of the transport frame comprise the longitudinal base members connected to a lower portion of the front frame assembly and the side members connected to an upper portion of the front frame assembly and to the longitudinal base members forming rigidizing triangles. Optionally, the transport frame further includes a rear frame assembly at the rear end and the longitudinal base members are connected to a lower portion of the rear frame assembly. Also optionally, the transport frame includes a plurality of side members at each side thereof connected to form multiple cooperating rigidizing triangles.

Preferably, the transport frame is configured to be disassembled in the deployment location and some or preferably all their members are configured to be incorporated to the single-axis solar tracker, once the latter is in the work arrangement, to perform different functions. For example, the longitudinal base members and the side members of the transport frame are configured to be incorporated, once the transport frame is disassembled, to the single-axis solar tracker as rigidizing members forming rigidizing triangles.

In one embodiment, the shaft section of each foldable panel array section has opposite first and second end portions, and each foldable panel array section further comprises a first supporting leg which supports a first bearing coupled to the first end portion of the shaft section. The first supporting leg is configured to be anchored to the ground when the single-axis solar tracker is in the work arrangement.

One of the foldable panel array sections is a motorized foldable panel array section which further to the first supporting leg comprises a second supporting leg configured to be anchored to the ground. This second supporting leg supports a drive motor-reducer unit coupled to the second end portion of the shaft section. The drive motor-reducer unit is operatively connected to rotate the shaft section in a conventional manner.

In this case, the longitudinal base members of the transport frame are preferably configured to be connected, once the transport frame is disassembled and the single-axis solar tracker is in the work arrangement, to lower portions of two adjacent supporting legs of the single-axis solar tracker and the side members of the transport frame are preferably configured to be connected to a lower portion of one of the two adjacent supporting legs and to an upper portion of the other of the two adjacent supporting legs. This way, the longitudinal base members and the side members of the transport frame form rigidizing triangles acting as rigidizing members for the single-axis solar tracker.

The fact of having the supporting legs attached to the foldable panel array sections of the tracking structure speeds deployment and reduces the need to precisely locate the support legs before mounting the tracking structure.

In one preferred embodiment, the solar panels are photovoltaic solar panels. In this case, an electrical box containing electrical equipment for the operation of the photovoltaic solar panels is included. The electrical box is optionally supported on the front frame assembly of the transport frame. This front frame assembly including the electrical box is configured to be placed, once the transport frame is disassembled and the single-axis solar tracker is in the work arrangement in the deployment location, nearby the single-axis solar tracker and electrically connected to the photovoltaic solar panels of the single-axis solar tracker.

Alternatively, the electrical box containing electrical equipment for the operation of the photovoltaic solar panels is supported on the second supporting leg which further supports the drive motor-reducer unit and thus the electrical box is integrated to the single-axis solar tracker when the plurality of foldable panel array sections are deployed into the work arrangement in the deployment location.

The transversal base members of the transport frame are optionally configured to be connected, once the transport frame is disassembled and the single-axis solar tracker is in the work arrangement, to lower portions of the supporting legs of the single-axis solar tracker, oriented in horizontal directions either perpendicular or parallel to the shaft sections and anchored to the ground or held down by counterweights, thereby providing greater stability to the supporting legs of the single-axis solar tracker and reinforced anchoring to the ground.

BRIEF DESCRIPTION OF THE DRAWINGS

The present invention will be better understood from the following detailed description of some illustrative and non-limitative embodiments with reference to the accompanying drawings, in which:

FIG. 8 is a perspective view of the plurality of foldable panel array sections of the single-axis solar tracker arranged into the shipping arrangement and fitted in the transport frame constituting a transport unit including a:

FIG. 9 is a perspective view of a transport frame and an electrical box supported on a second supporting leg of a deployable solar tracker system according to another embodiment of the present invention;

DETAILED DESCRIPTION OF EXEMPLARY EMBODIMENTS

Figure 6:
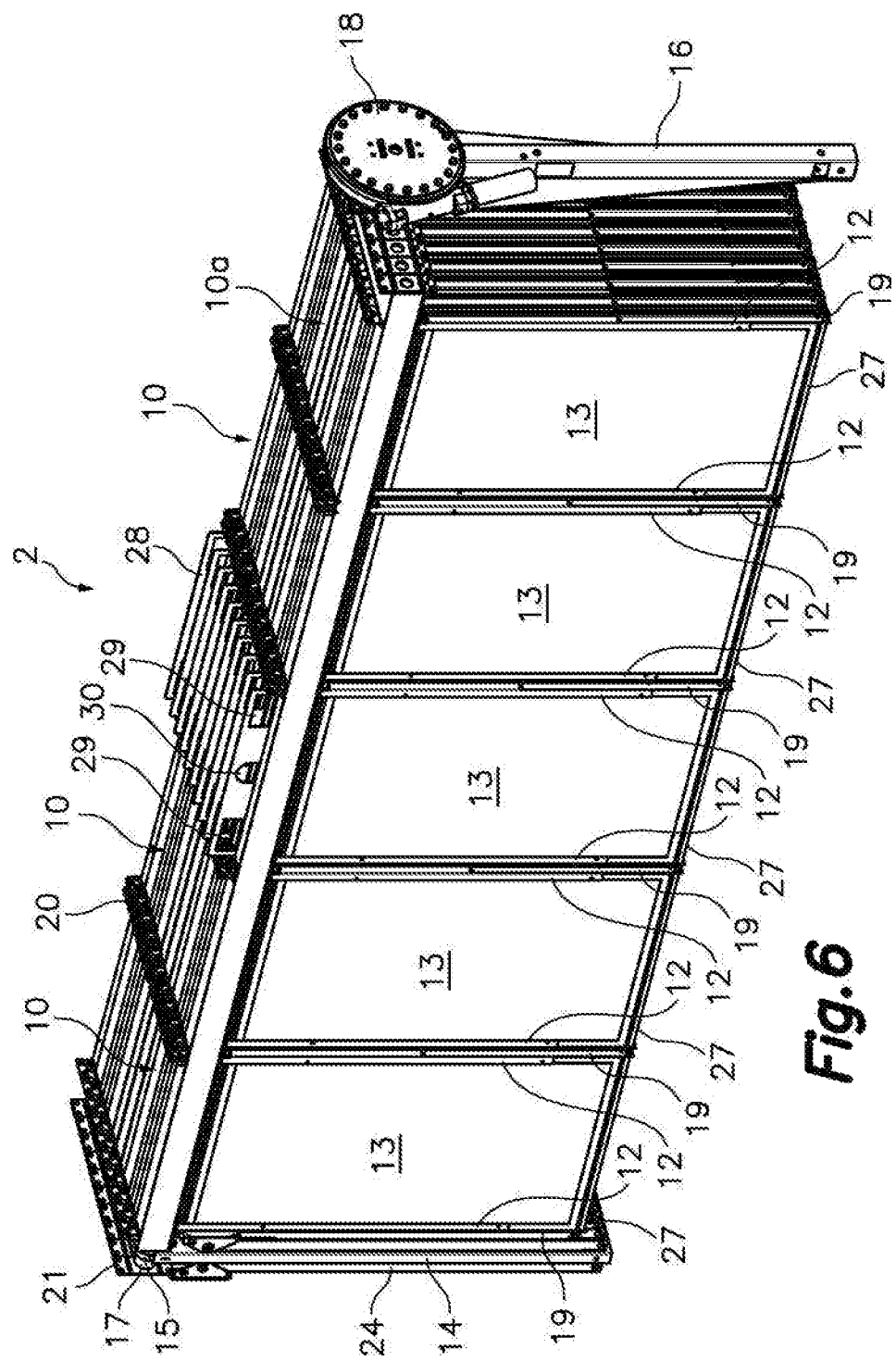
FIG. 6 is a perspective view of the plurality of foldable panel array sections of the single-axis solar tracker arranged into a shipping arrangement.
Figure 7:
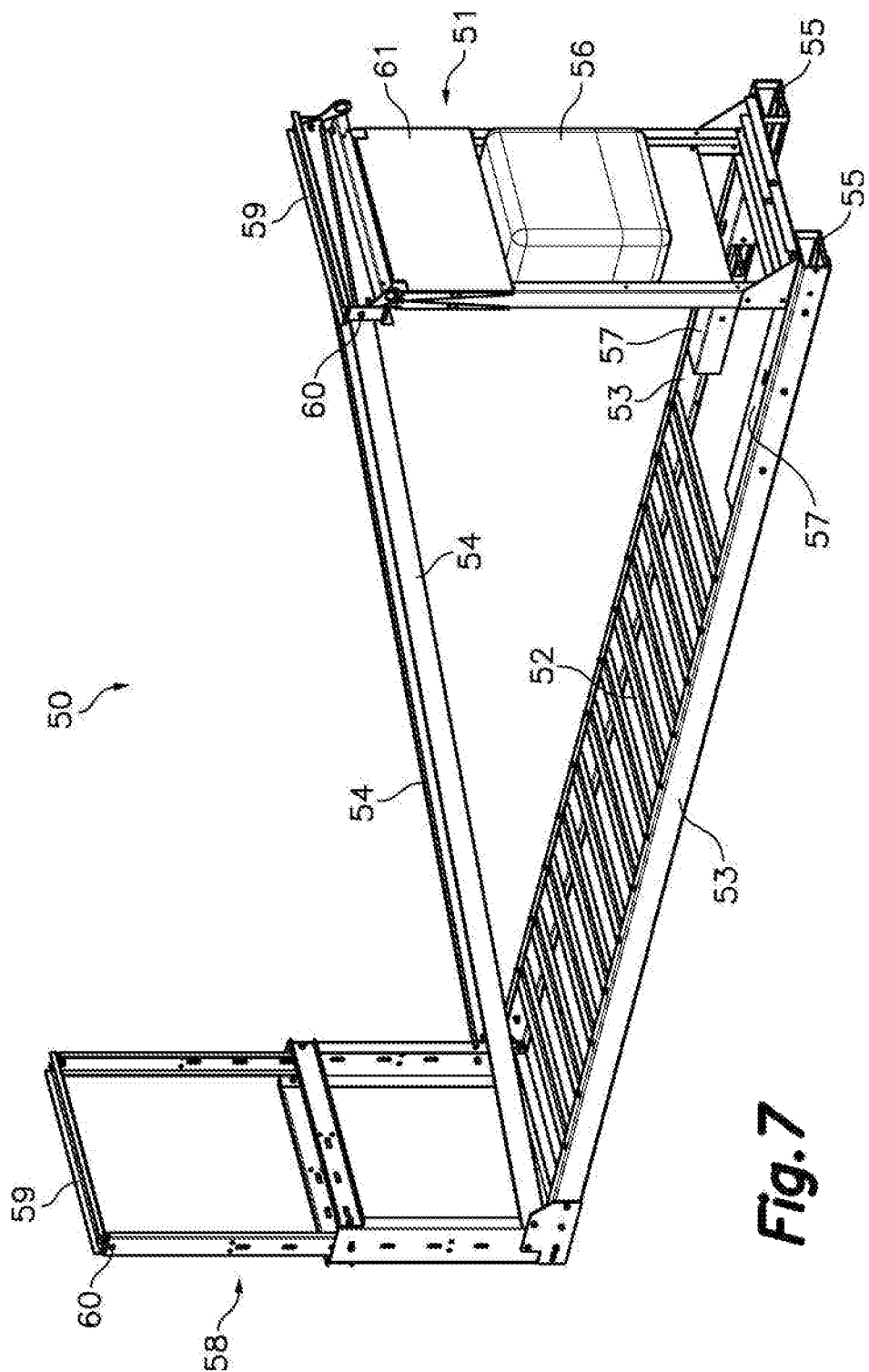
FIG. 7 is a perspective view of the transport frame alone.

Referring first to FIGS. 1 to 8, a deployable solar tracker system is shown according to an embodiment of the present invention which comprises a single-axis solar tracker 1 (shown in FIG. 1 in a work arrangement) and a transport frame 50 (shown in FIG. 7). The deployable solar tracker system is configured to be packaged in a shipping configuration into a transport unit 2 (shown in FIG. 8) for shipping.

The single-axis solar tracker 1 includes a plurality of foldable panel array sections 10, 10a, each comprising a shaft section 11, a plurality of paired support ribs 12 hinged to the shaft section 11, and a plurality of solar panels 13 attached to the support ribs 12. The solar panels 13 are photovoltaic solar panels each having an energy-collecting surface. The support ribs 12 together with the solar panels 13 are movable between a folded position (shown in FIGS. 2, 4, 6 and 8), in which the solar panels 13 are opposite and parallel to each other, and an unfolded position (shown in FIGS. 1, 3 and 5), in which the energy-collecting surfaces of the solar panels 13 are coplanar to each other. In the folded position, the support ribs 12 together with the solar panels 13 are hanging from the shaft section 11 by gravity.

Each foldable panel array section 10, 10a includes a plurality of strut members 19 connected to the support ribs 12 and a plurality of connection brackets 20 attached to the shaft section 11. Each strut member 19 has a first end hinged to one of the support ribs 12 and a second end configured to be coupled to a corresponding one of the connection brackets 20 so that the strut members 19 cooperate with the support ribs 12 to form a truss structure configured to keep the solar panels 13 in the unfolded position. The second ends of each pair of strut members 19 flanking one solar panel 13 are connected to one another by a connection bar 27. The connection brackets 20 include a latch mechanism allowing quickly and easily coupling and releasing the second ends of the strut members 19 or the connection bars 27.

Alternatively, the coupling of the strut members 19 to the connection brackets 20 can be performed by other means, for example as described in document WO 2017068413 A1 cited above.

Each solar panel 13 has opposite side edges attached to respective support ribs 12 so that the support ribs 12 do not protrude from the main surfaces of the solar panels 13, and the strut members 19 are located between two adjacent support ribs 12 or aside the end support ribs 12 so that, in the folded position, the strut members 19 do not protrude from support ribs 12. Thus, the foldable panel array sections 10, 10*a* are very thin when in the folded position meaning that a maximum number of units can fit in the transport frame 50.

The plurality of foldable panel array sections 10, 10*a* include any number (three in the work arrangement shown in FIG. 1) of simple foldable panel array sections 10 and at least one motorized foldable panel array section 10*a*.

As better shown in FIGS. 4 to 7, each simple foldable panel array section 10 and the motorized foldable panel array section 10*a* further comprises a first supporting leg 14 configured to be anchored to the ground. The shaft section 11 has opposite first and second end portions, and the first supporting leg 14 supports a first bearing 15 coupled to the first end portion of the shaft section 11, so that the shaft section 11 can freely rotate with respect to the first supporting leg 14.

The motorized foldable panel array section 10*a* (Shown in FIGS. 4 and 5) comprises, in addition to the first supporting leg 14, a second supporting leg 16 configured to be anchored to the ground. The second supporting leg 14 supports a drive motor-reducer unit 18 coupled to the second end portion of the shaft section 11. The drive motor-reducer unit 18 has an output shaft operatively connected to rotate the shaft section 11 with respect to the first and second supporting legs 14, 16.

The first and second supporting legs 14, 16 have at opposite sides thereof deployable buttress members 24, 25 to confer more stability to the first single-axis solar tracker 1 when the first and second supporting legs 14, 16 are anchored to the ground in the work arrangement. In the folded position, the buttress members 24, 25 are located at front and rear sides of the respective first and second supporting legs 14, 16 in order to not protrude laterally from the solar panels 13, and they can be rotated a quarter of turn or can be disassembled, turned and assembled again into the required position for the work arrangement. Alternatively, the first and second supporting legs 14, 16 can be deployable, for example, as described in document WO 2017068413 A1 cited above.

Figure 1:
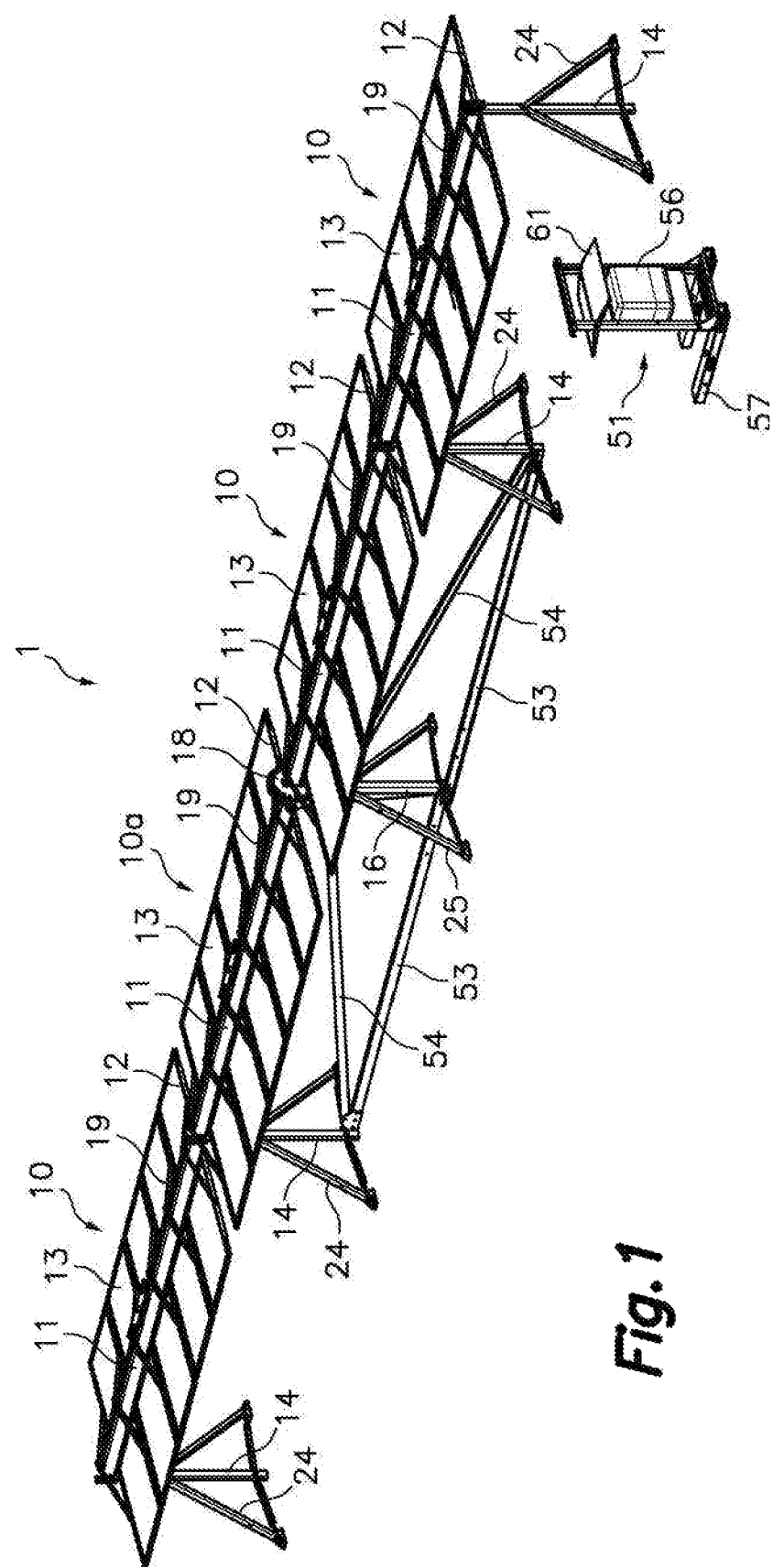
FIG. 1 is a perspective view of a deployable solar tracker system according to an embodiment of the present invention in a work arrangement, including a single-axis solar tracker and some elements of a transport frame once dismantled.
Figure 2:
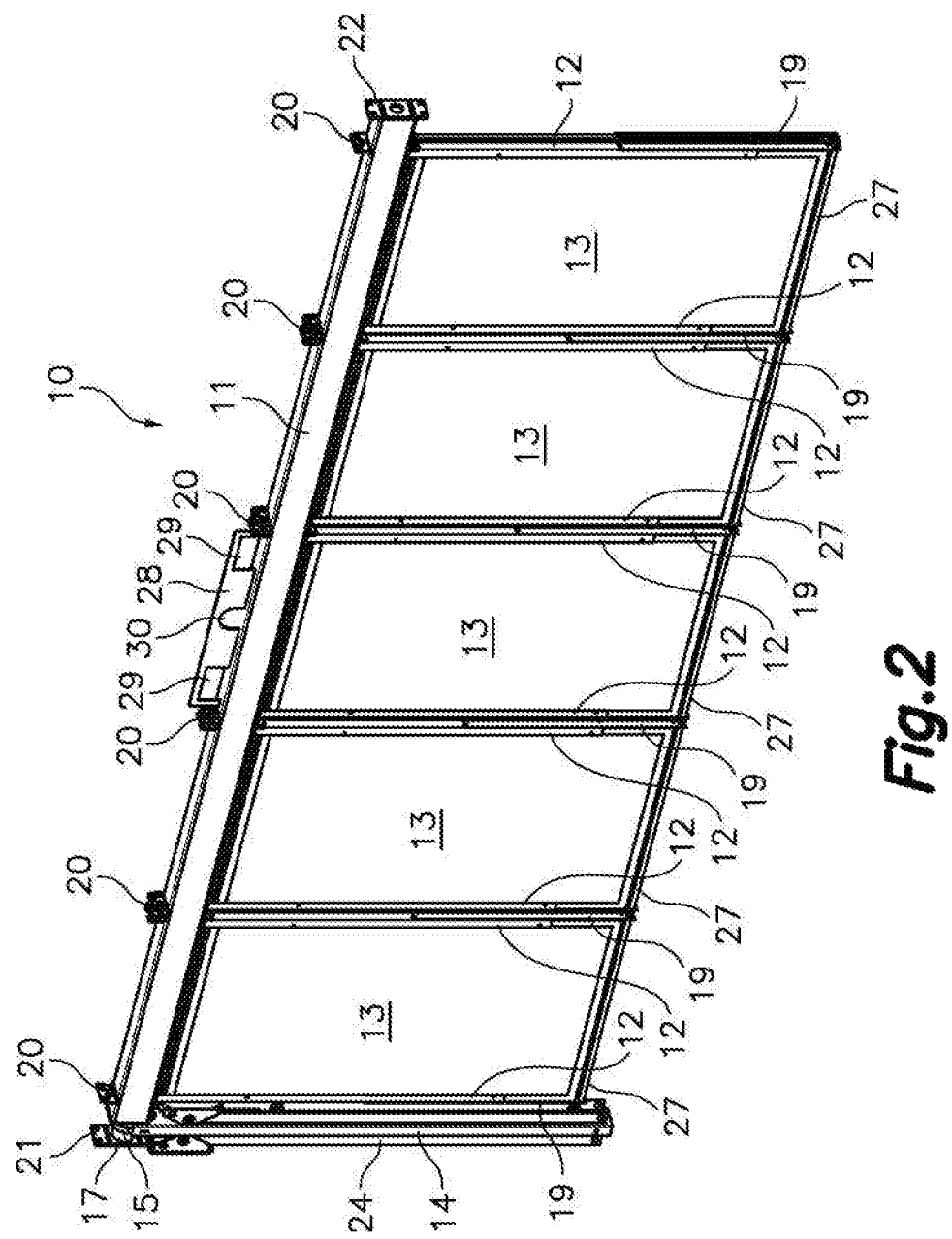
FIG. 2 is a perspective view of a simple foldable panel array section belonging to a plurality of foldable panel array sections of the single-axis solar tracker in a folded position.
Figure 3:
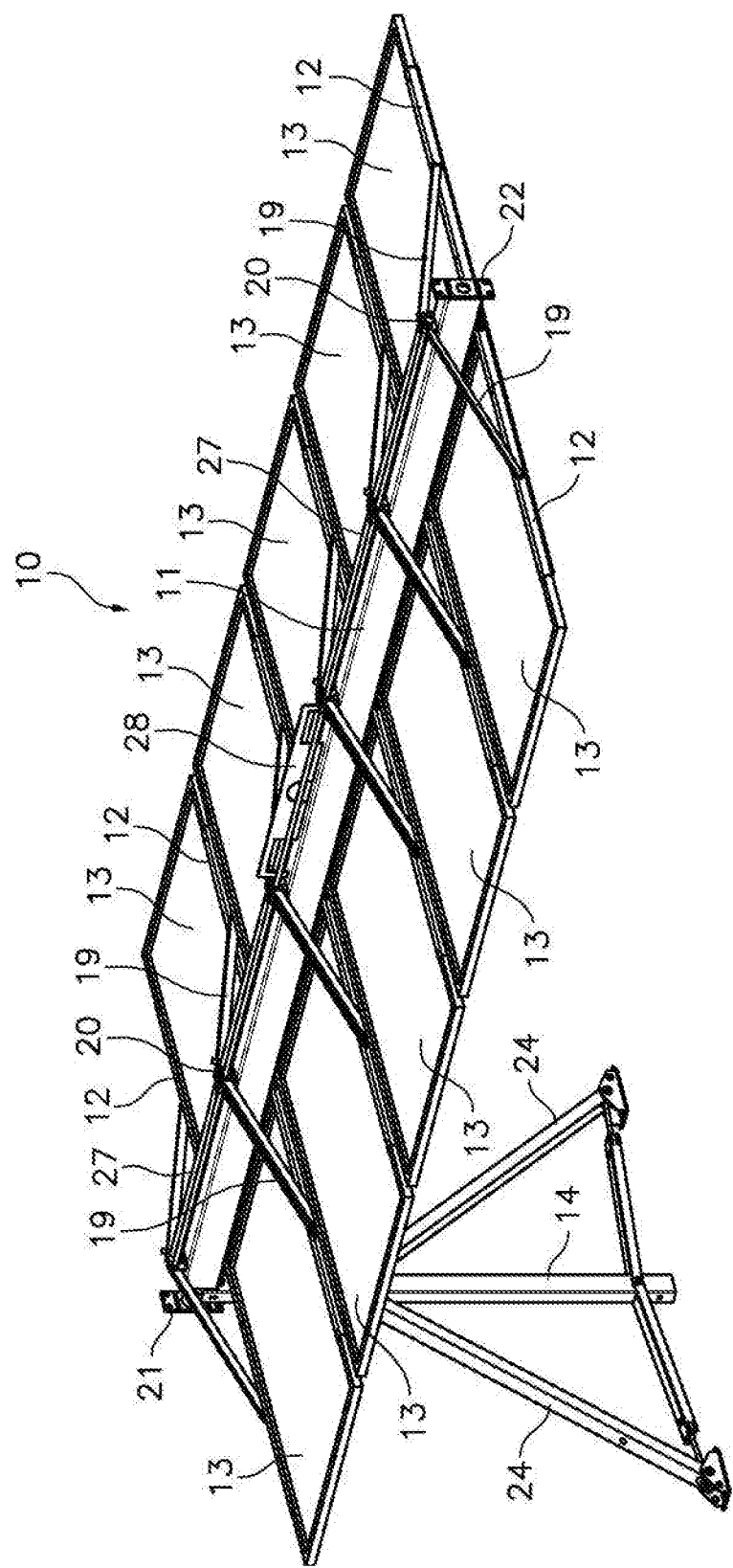
FIG. 3 is a perspective view of the simple foldable panel array section of FIG. 2, in an unfolded position.
Figure 4:
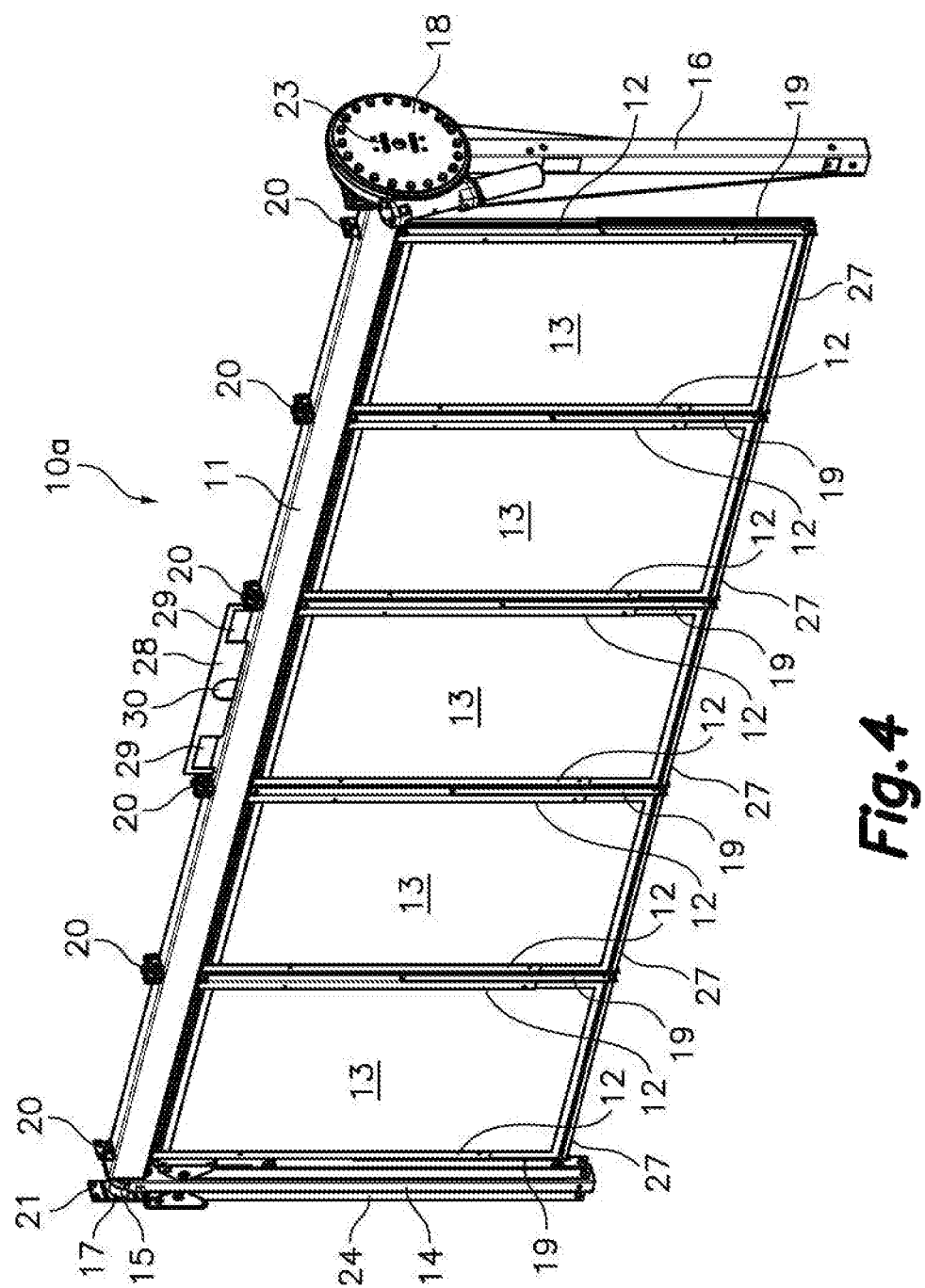
FIG. 4 is a perspective view of a motorized foldable panel array section belonging to the plurality of foldable panel array sections of the single-axis solar tracker in a folded position.
Figure 5:
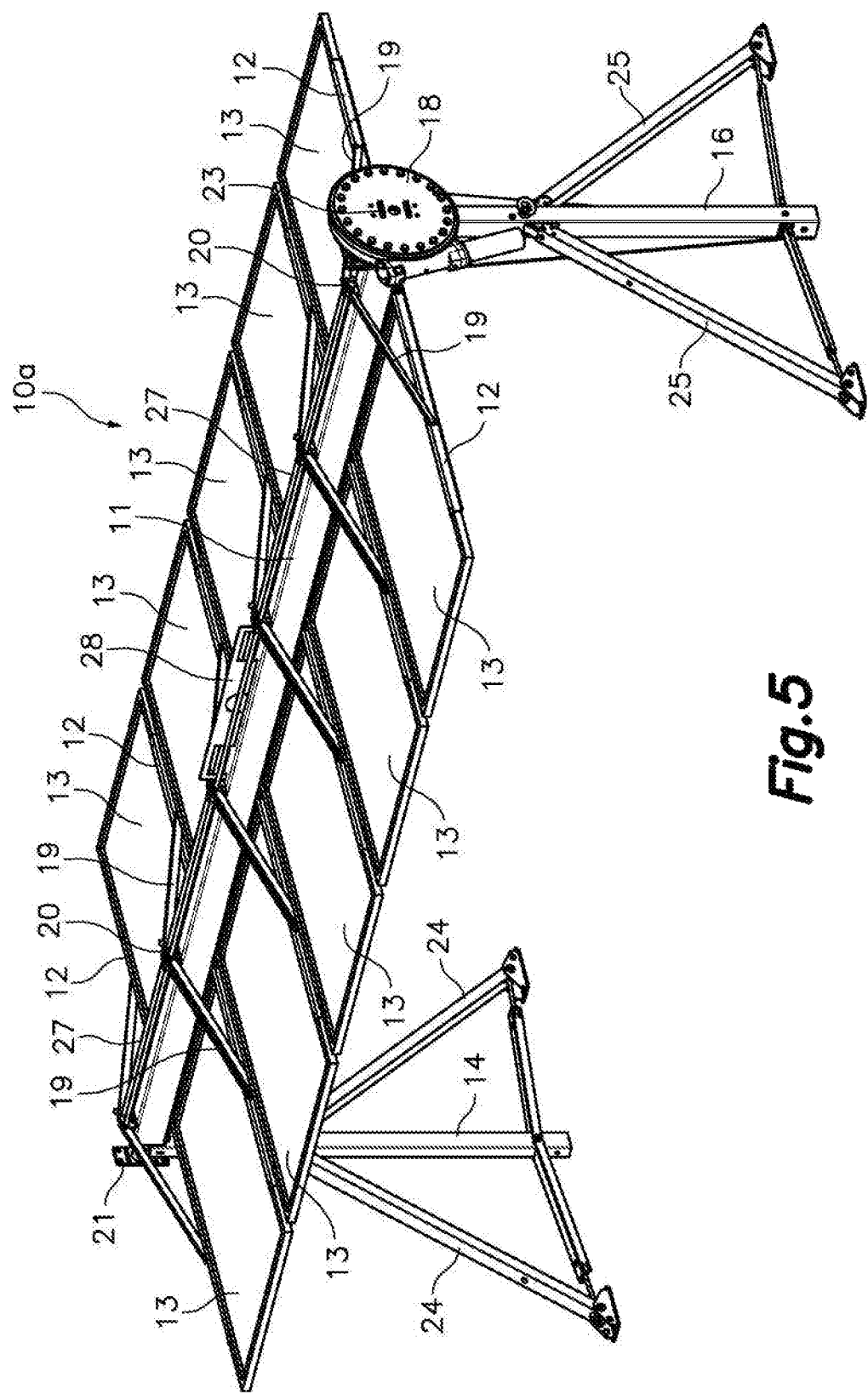
FIG. 5 is a perspective view of the motorized foldable panel array section of FIG. 4, in an unfolded position.

In the work arrangement shown in FIG. 1, the shaft sections 11 of the foldable panel array sections 10 are connected together by torque transmitting couplings 17, such as for example universal joints or other kind of joints, and the support ribs 12 and solar panels 13 are in the unfolded position. To this end, each foldable panel array section 10 has one torque transmitting coupling 17 attached to the first end portion of the shaft section 11, and the torque transmitting coupling 17 has a first connection flange 21 at a distal end thereof. In the simple foldable panel array sections 10, a second connection flange 22 is attached to the second end portion of the shaft section 11. In the motorized foldable panel array section 10*a*, a flange connector 23 in alignment with the shaft section 11 is provided at a distal end section of the drive motor-reducer unit 18.

The second connection flange 22 of each simple foldable panel array section 10 is configured to be connected to the first connection flange 21 of an adjacent simple foldable panel array section 10, to the first connection flange 21 of the motorized foldable panel array section 10*a*, or to the flange connector 23 of the motorized foldable panel array section 10*a*. Thus, in the work arrangement, the motorized foldable panel array section 10*a* can be installed at any position. However, it is preferred that the motorized foldable panel array section 10*a* be installed in an intermediate position between two of the simple foldable panel array sections 10 so the drive motor-reducer unit 18 to be located in a central or near to central position with respect to the assembled shaft sections 11.

The plurality of foldable panel array sections 10, 10*a*, which in the work arrangement shown in FIG. 1 includes three of the simple foldable panel array sections 10 and one motorized foldable panel array section 10*a*, are configured for being arranged into a shipping arrangement (FIG. 6) and fitted into the transport frame 50 (FIG. 7) constituting the aforementioned transport unit 2 (FIG. 8) in order to be shipped all together, for example by a transport vehicle. In the shipping arrangement, the respective shaft sections 11 are side by side and parallel to each other and the support ribs 12 and solar panels 13 are in the folded position.

As better shown in FIG. 7, the transport frame 50 is elongated in a longitudinal direction and comprises a front end and an opposite rear end in the longitudinal direction. Preferably, the transport frame 50 is suitably dimensioned so as the transport unit 2 can be packed into a 40' standard shipping container with three other transport units 2. The 40' standard shipping container has a length in the longitudinal direction that is 5 times longer than a width in a transversal direction, meaning that the transport frame has a length in the longitudinal direction that is more than 5 times longer than a width in a transversal direction. However, other dimensions and proportions are possible for the transport frame.

The transport frame 50 has a front frame assembly 51 located at the front end, two longitudinal base members 53 parallel to the longitudinal direction, a plurality of transversal base members 52 perpendicular to the longitudinal direction, and two mutually parallel side members 54. The front frame assembly 51, the longitudinal base members 53, the transversal base members 52, and the side members 54 are dimensioned and connected together to hold the plurality of foldable panel array sections 10, 10*a* in the shipping arrangement and with the shaft sections 11 of the foldable panel array sections 10, 10*a* parallel to the longitudinal base members 53. In the shipping arrangement shown in FIGS. 6 and 8, the plurality of foldable panel array sections 10, 10*a* includes nine of the simple foldable panel array sections 10 and one motorized foldable panel array section 10*a*.

More specifically, the two longitudinal base members 53 are connected at one end thereof to a lower portion of the front frame assembly 51, and the side members 54 are connected to an upper portion of the front frame assembly 51 and to points of the longitudinal base members 53 located away from the front frame assembly 51, thereby forming rigidizing triangles. The transversal base members 52 are connected at both ends thereof to the longitudinal base members 53. With this configuration, the front frame assembly 51, the longitudinal base members 53 and the side members 54 constitute rigidizing structural elements providing flexural stiffness to the transport frame 50 in the longitudinal direction.

In the embodiment shown, the transport frame 50 further includes a rear frame assembly 58 located at the rear end and the longitudinal base members 53 are connected to a lower portion of the rear frame assembly 58. This rear frame assembly 58 is optional.

Figure 8:
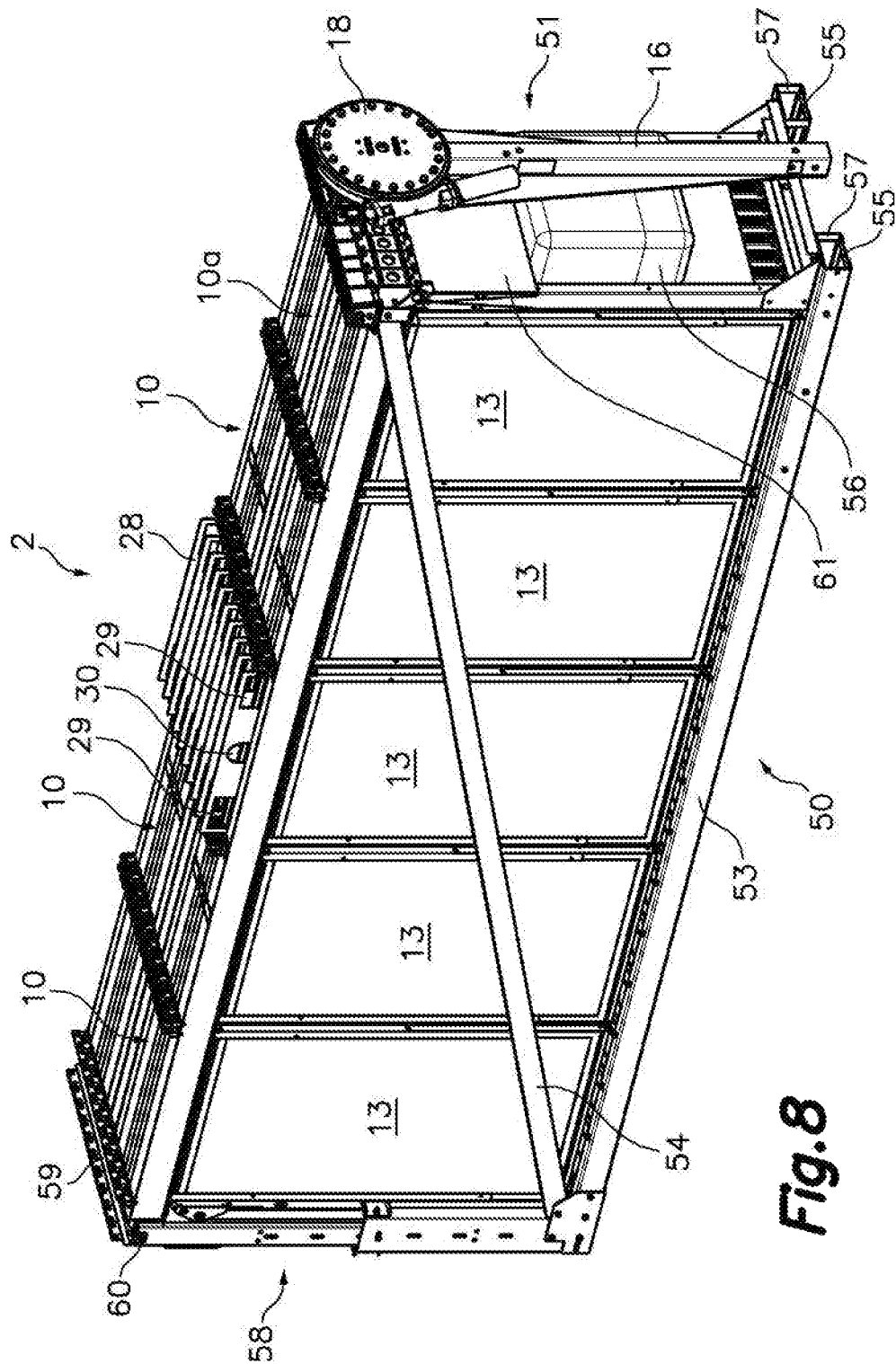

The plurality of foldable panel array sections 10, 10a when arranged in the shipping arrangement and fitted into the transport frame 50 are secured to the transport frame 50 by means of one or more locking members 59 that can be attached to the transport frame 50 engaging the plurality of foldable panel array sections 10, 10a, for example two transversal locking members 59 arranged over front and rear end portions of the shaft sections 11 and releasably attached to the front and rear frame assemblies 51, 58 by bolts 60 (FIGS. 7 and 8). Different rear locking members can be provided when the rear frame assembly is omitted.

The front frame assembly 51 has a pair of longitudinal fork-receiving members 57 attached to a lower end thereof. These longitudinal fork-receiving members 57 are tubular or profiled members parallel to the longitudinal base members 53 inserted into a front portion of the two longitudinal base members 53 and attached thereto. The longitudinal fork-receiving members 57 define end fork-receiving openings 55 arranged at a longitudinal front end of the transport frame 50. As a result, the longitudinal fork-receiving members 57 are located at a front end of the transport unit 2 (FIG. 8).

The end fork-receiving openings 55 are shaped and dimensioned for receiving fork members of a forklift (not shown) oriented in a longitudinal direction parallel to the longitudinal base members 53, so that the transport unit 2 can be handled with the forklift from the longitudinal front end of the transport unit 2, making it possible, for example, for the transport unit 2 to be loaded into and unloaded from a standard shipping container through a longitudinal end door thereof.

Each one of the foldable panel array sections 10, 10a has a handling element 28 attached to the shaft section 11 and positioned so that handling element 28 is on top of the shaft section 11 when the support ribs 12 together with the solar panels 13 are in the folded position hanging from the shaft section by gravity. The handling element 28 has two side fork-receiving openings 29 dimensioned for receiving fork members of a forklift oriented in a transversal direction perpendicular to the shaft section 11 and one lift bar-receiving opening 30 dimensioned for receiving a lift bar configured for being hooked by protruding opposite ends thereof by a crane. The handling element 28 with the side fork-receiving openings 29 and the lift bar-receiving opening 30 is located at a middle portion of the shaft section 11 selected to balance the weight of the foldable panel array section 10, 10a at both sides of the side fork-receiving openings 29 or of the lift bar-receiving opening 30.

In the shipping arrangement shown in FIGS. 6 and 8, the side fork-receiving openings 29 and the lift bar-receiving openings 30 of all the foldable panel array sections 10, 10a are mutually aligned, so that, when the foldable panel array sections 10, 10a are secured to the transport frame 50, the transport unit 2 can be handled all together with the forklift from either side thereof or with the crane. When the foldable panel array sections 10, 10a are not secured to the transport frame 50, the foldable panel array sections 10, 10a can be handled all together with the forklift or the crane, for example to unload them from the transport frame 50, or individually to place each foldable panel array section 10, 10a in position to form the single-axis solar tracker 1.

Optionally, the longitudinal base members of the transport frame may comprise transversal fork-receiving members defining additional fork-receiving openings (not shown) dimensioned for receiving the fork members of the forklift oriented in a transversal direction perpendicular to the longitudinal base members. The transversal fork-receiving members are located at a middle portion of the longitudinal base members selected to balance the weight of the transport unit at both sides of the additional fork-receiving openings.

Thus, the transport unit can be unloaded from the transport vehicle and the single-axis solar tracker can be arranged in the work arrangement (FIG. 1) in a deployment location. The transport frame 50 is configured to be disassembled in the deployment location and the longitudinal base members 53 and the side members 54 of the transport frame 50 are configured to be incorporated to the single-axis solar tracker 1 as rigidizing members forming rigidizing triangles.

In the embodiment shown in FIG. 1, the longitudinal base members 53 of the transport frame 50 are connected to lower portions of two adjacent supporting legs 14, 16 of the single-axis solar tracker 1 and the side members 54 of the transport frame 50 are configured to be connected to a lower portion of one of the two adjacent supporting legs 14, 16 and to an upper portion of the other of the two adjacent supporting legs 14, 16 forming the rigidizing triangles.

The front frame assembly 51 of the transport frame 50 supports an electrical box 56 containing electrical equipment for the operation of the photovoltaic solar panels 13. Once the transport unit is disassembled in the deployment location, the front frame assembly 51 including the electrical box 56 is configured to be placed nearby the single-axis solar tracker 1 and to be electrically connected to the photovoltaic solar panels of the single-axis solar tracker 1, for example by means of a connection cable (not shown). In this situation, the longitudinal fork-receiving members 57 provide a support base to the front frame assembly 51. The front frame assembly 51 further includes deployable roof members 61 which can be deployed into a protecting position to protect the electrical box 56, for example, against direct sunshine and rain.

Optionally, the transversal base members 52 of the transport unit 2 are configured to be connected to lower portions of the supporting legs 14, 16 of the single-axis solar tracker 1 in horizontal directions perpendicular to the shaft sections 11 and anchored to the ground to confer more stability to the single-axis solar tracker 1. Preferably, virtually all the components of the transport unit 2 are configured to be incorporated to the single-axis solar tracker once the transport unit 2 is disassembled in the deployment location.

Figure 11:
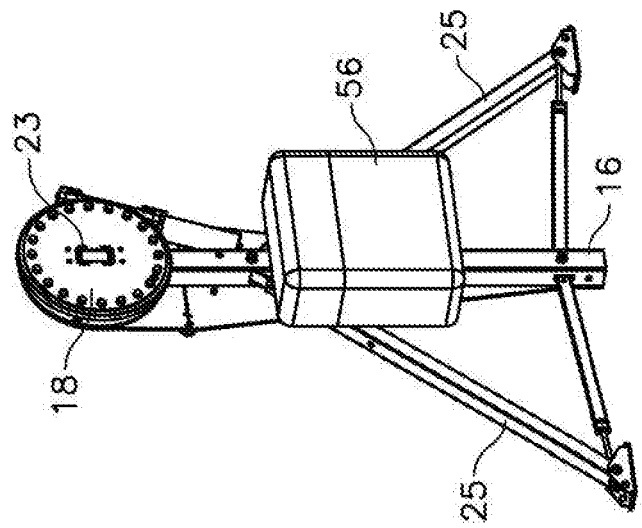
FIG. 11 is a perspective view of the second supporting leg and the electrical box in a deployed position.
Figure 10:
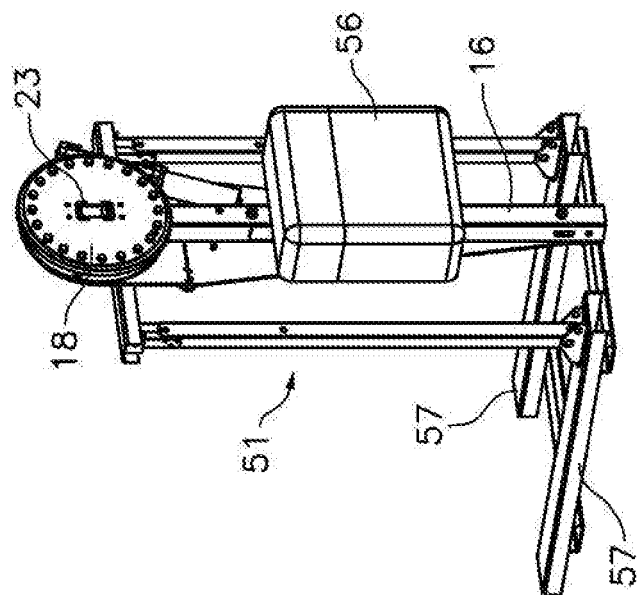
FIG. 10 is a perspective view of a front frame assembly supporting the second supporting leg and the electrical box detached from the transport frame.

With reference to FIGS. 9 to 11 an alternative embodiment of the deployable solar tracker system is now described, which essentially differs from the embodiment shown in FIGS. 1 to 7 in that the electrical box 56 containing electrical equipment for the operation of the photovoltaic solar panels 13 is supported by the second supporting leg 16 which in turn further supports the drive motor-reducer unit 18 instead of by the front frame assembly 51.

In FIGS. 9 to 11, the simple foldable panel array sections 10 are not shown and only the second supporting leg 16 supporting the electrical box 56 of the motorized foldable panel array section 10a is shown for the sake of clarity.

FIG. 9 shows the position that the second supporting leg 16 supporting the electrical box 56 would have in the front frame assembly 51 of the transport frame 50 when the plurality of foldable panel array sections 10, 10a were arranged in the shipping arrangement and fitted to the transport frame 50. The support frame 50 is similar to that shown in FIG. 7 except in that here the rear frame assembly 58 and some of the transversal base members 52 are omitted.

FIG. 10 shows the front frame assembly 51 separated from the transport frame 50 and the second supporting leg 16 supporting the electrical box 56 supported on the front frame assembly 51. In this embodiment, the motorized foldable panel array section 10a is comprised of a foldable panel array section like the simple foldable panel array section 10 described above with reference to FIGS. 2 and 3 and the second supporting leg 16 supporting the electrical box 56, with the second connection flange 22 located at the second end portion of the shaft section 11 being connected to one of the flange connectors 23 provided at opposite sides of the drive motor-reducer unit 18.

When the single-axis solar tracker 1 according to this embodiment is arranged into the work arrangement, the front frame assembly is dismantled and the buttress members 25 of the second supporting leg 16 supporting the electrical box 56 are deployed as shown in FIG. 11 to confer stability to the first single-axis solar tracker 1 when the first and second supporting legs 14, 16 are anchored to the ground.

In still another embodiment (not shown), the front frame assembly 51 supports both the electrical box 56 and the drive motor-reducer unit 18, and is configured to act as the second supporting leg of the motorized foldable panel array section 10a when the transport frame is dismantled. In this embodiment, the second connection flange 22 of the motorized foldable panel array section 10a can be disconnected from the corresponding flange connector 23 of the drive motor-reducer unit 18 when the single-axis solar tracker 1 is in the shipping configuration and can be connected when the single-axis solar tracker 1 is arranged into the work configuration.

The scope of the invention is defined by the appended claims.

The invention claimed is:

1. A deployable solar tracker system comprising a single-axis solar tracker including a plurality of foldable panel array sections, each foldable panel array section comprising:
   a shaft section;
   a plurality of paired support ribs arranged at opposite sides of said shaft section and hinged to the shaft section; and
   a plurality of solar panels attached to said support ribs;
   wherein the support ribs and solar panels are movable between a folded position, in which the solar panels are opposite and parallel to each other, and an unfolded position, in which energy-collecting surfaces of the solar panels are coplanar to each other;
   and wherein the plurality of foldable panel array sections are configured for being shipped together in a shipping arrangement, in which the respective shaft sections are side by side and parallel to each other and the support ribs and solar panels are in said folded position, and for being unloaded in a deployment location and arranged in a work arrangement, in which the respective shaft sections are aligned and connected together and the support ribs and solar panels are in said unfolded position,
   wherein each foldable panel array section has a handling element attached on top of the shaft section thereof, said handling element having at least one handle opening dimensioned for receiving at least one lift member in a transversal direction perpendicular to the shaft section, said handle openings of the handling elements of the plurality of the foldable panel array sections being mutually aligned in the shipping arrangement,
   further comprising a transport frame elongated in a longitudinal direction and dimensioned to hold the plurality of foldable panel array sections in said shipping arrangement with the shaft sections oriented parallel to said longitudinal direction,
   wherein the transport frame comprises a front end and an opposite rear end in the longitudinal direction, a front frame assembly located at said front end, longitudinal base members parallel to the longitudinal direction, transversal base members, and side members connected together, and
   wherein the transport frame further comprises end fork-receiving openings arranged at said front end of the transport frame and dimensioned for receiving fork members of a forklift oriented in the longitudinal direction, and rigidizing structural elements providing flexural stiffness to the transport frame in the longitudinal direction,
   wherein said rigidizing structural elements comprise the longitudinal base members connected to a lower portion of said front frame assembly and said side members connected to an upper portion of the front frame assembly and to the longitudinal base members forming rigidizing triangles,
   wherein the transport frame is configured to be disassembled in said deployment location and the longitudinal base members and the side members of the transport frame are configured to be incorporated to said single-axis solar tracker as rigidizing members forming rigidizing triangles.

2. The deployable solar tracker system of claim 1, wherein said at least one handle opening are side fork-receiving openings dimensioned for receiving fork members of a forklift oriented in a transversal direction perpendicular to the shaft section and/or at least one lift bar-receiving opening dimensioned for receiving a lift bar able to be hooked by a crane.

3. The deployable solar tracker system of claim 1, wherein the shaft section of each foldable panel array section has opposite first and second end portions, wherein each foldable panel array section further comprises a first supporting leg configured to be anchored to the ground, and wherein said first supporting leg supports a first bearing coupled to said first end portion of the shaft section.

4. The deployable solar tracker system of claim 3, wherein one of the foldable panel array sections is a motorized foldable panel array section (10a) further comprising a second supporting leg (16) configured to be anchored to the ground, said second supporting leg (16) supporting a drive motor-reducer unit (18) coupled to said second end portion of the shaft section (11) to rotate the shaft section (11).

5. The deployable solar tracker system of claim 1, wherein the shaft section of each foldable panel array section has opposite first and second end portions, wherein each foldable panel array section further comprises a first supporting leg configured to be anchored to the ground, and said first supporting leg supports a first bearing coupled to said first end portion of the shaft section, wherein one of the foldable panel array sections is a motorized foldable panel array section further comprising a second supporting leg configured to be anchored to the ground, said second supporting leg supporting a drive motor-reducer unit coupled to said second end portion of the shaft section to rotate the shaft section, and wherein said longitudinal base members of the transport frame are configured to be connected to lower portions of two adjacent supporting legs of the single-axis sola r tracker and said side members of the transport frame are configured to be connected to a lower portion of one of said two adjacent supporting legs and to an upper portion of the other of the two adjacent supporting legs as rigidizing members forming rigidizing triangles.

6. The deployable solar tracker system of claim 1, wherein the solar panels are photovoltaic solar panels, said front frame assembly of the transport frame supports an electrical box containing electrical equipment for the operation of the photovoltaic solar panels, and the front frame assembly including said electrical box is configured to be placed nearby the single-axis solar tracker in the deployment location and electrically connected to said photovoltaic solar panels of the single-axis solar tracker.

7. The deployable solar tracker system of claim 4, wherein the solar panels are photovoltaic solar panels, and said second supporting leg supports an electrical box containing electrical equipment for the operation of the photovoltaic solar panels.

8. The deployable solar tracker system of claim 1, wherein the front frame assembly comprises longitudinal fork-receiving members parallel to the longitudinal direction, said longitudinal fork-receiving members defining said end fork-receiving openings.

9. The deployable solar tracker system of claim 5, wherein said transversal base members are configured to be connected to lower portions of the first and second supporting legs of the single-axis solar tracker in horizontal directions perpendicular or parallel to the shaft sections and anchored to the ground or held down by counterweights.

10. The deployable solar tracker system of claim 1, further comprising at least one locking member configured to be attached to the transport frame engaging the plurality of foldable panel array sections arranged in the shipping arrangement and fitted into the transport frame to secure the plurality of foldable panel array sections to the transport frame.

11. The deployable solar tracker system of claim 5, wherein the solar panels are photovoltaic solar panels, said front frame assembly of the transport frame supports an electrical box containing electrical equipment for the operation of the photovoltaic solar panels, and the front frame assembly including said electrical box is configured to be placed nearby the single-axis solar tracker in the deployment location and electrically connected to said photovoltaic solar panels of the single-axis solar tracker.

12. The deployable solar tracker system of claim 5, wherein the solar panels are photovoltaic solar panels, and said second supporting leg supports an electrical box containing electrical equipment for the operation of the photovoltaic solar panels.

13. The deployable solar tracker system of claim 5, further comprising at least one locking member configured to be attached to the transport frame engaging the plurality of foldable panel array sections arranged in the shipping arrangement and fitted into the transport frame to secure the plurality of foldable panel array sections to the transport frame.

* * * * *